United States Patent
Park

(10) Patent No.: US 9,571,167 B2
(45) Date of Patent: *Feb. 14, 2017

(54) NEAR FIELD COMMUNICATION ANTENNA DEVICE OF MOBILE TERMINAL

(71) Applicant: Samsung Electronics Co., Ltd., Suwon-si, Gyeonggi-do (KR)

(72) Inventor: Sung Ryong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,840

(22) Filed: Feb. 4, 2015

(65) Prior Publication Data

US 2015/0147967 A1   May 28, 2015

Related U.S. Application Data

(63) Continuation of application No. 13/530,697, filed on Jun. 22, 2012, now Pat. No. 8,983,377.

(30) Foreign Application Priority Data

Jul. 13, 2011  (KR) .................. 10-2011-0069259

(51) Int. Cl.
| | |
|---|---|
| H04B 5/00 | (2006.01) |
| H01Q 1/24 | (2006.01) |
| H01Q 7/00 | (2006.01) |
| H04M 1/02 | (2006.01) |

(52) U.S. Cl.
CPC ............ *H04B 5/0081* (2013.01); *H01Q 1/243* (2013.01); *H01Q 7/00* (2013.01); *H04M 1/0266* (2013.01); *H04M 2250/04* (2013.01); *H04M 2250/22* (2013.01)

(58) Field of Classification Search
CPC .................................................. H04B 5/0081
USPC ......... 455/41.1, 41.2, 562.1, 575.7; 343/726, 343/728; 345/156, 173
See application file for complete search history.

(56) References Cited

U.S. PATENT DOCUMENTS

| | | | |
|---|---|---|---|
| 6,078,299 A | 6/2000 | Scharfe, Jr. et al. | |
| 7,307,625 B2 | 12/2007 | Kurashima et al. | |
| 8,121,544 B2* | 2/2012 | Shimizu et al. | ............. 455/41.1 |
| 8,577,289 B2* | 11/2013 | Schlub et al. | ............... 455/41.1 |
| 2011/0273382 A1* | 11/2011 | Yoo | ......................... G06F 3/041 |
| | | | 345/173 |

* cited by examiner

*Primary Examiner* — Tuan H Nguyen
(74) *Attorney, Agent, or Firm* — Jefferson IP Law, LLP

(57) ABSTRACT

A near field communication antenna device of a mobile terminal having a near field communication antenna function of 13.56 MHz by Alternating Current (AC) coupling a conductive pattern of a touch screen panel is provided. The device includes a conductive pattern formed in a touch screen panel, a first antenna line AC-coupled to one end of the conductive pattern, a second antenna line AC-coupled to the other end of the conductive pattern, and a near field communication module connected to the first antenna line and the second antenna line. Therefore, a near field communication antenna can be embodied using a conductive pattern of an existing touch screen panel. Accordingly, an increase in thickness and material cost of a mobile terminal can be prevented.

20 Claims, 8 Drawing Sheets

NEAR FIELD COMMUNICATION ANTENNA DEVICE OF MOBILE TERMINAL

PRIORITY

This application is a continuation application of a prior application Ser. No. 13/530,697, filed on Jun. 22, 2012, which claimed the benefit under 35 U.S.C. §119(a) of a Korean patent application filed on Jul. 13, 2011 in the Korean Intellectual Property Office and assigned Serial No. 10-2011-0069259, the entire disclosures of each of which are hereby incorporated by reference.

BACKGROUND OF THE INVENTION

1. Field of the Invention

The present invention relates to a near field communication antenna device of a mobile terminal. More particularly, the present invention relates to a near field communication antenna device of a mobile terminal having a near field communication antenna function of 13.56 MHz by Alternating Current (AC) coupling a conductive pattern of a touch screen panel.

2. Description of the Related Art

Nowadays, as data sharing, payment, and ticketing using a mobile terminal increase, a near field communication antenna device is mounted in the mobile terminal. In order to perform communication of a near distance of 10 to 20 cm using a low frequency of 13.56 MHz (±7 kHz), the near field communication antenna device has an Inductor Capacitor (LC) resonance loop antenna of a method of using magnetic coupling.

FIG. 1 is a rear view illustrating a mobile terminal having a near field communication antenna device according to the related art. For reference, in a mobile terminal 101 shown in FIG. 1, a rear case (not shown) is exposed.

Referring to FIG. 1, a mobile terminal near field communication antenna device 100 formed with an antenna line forming a loop is mounted within a battery 102 mounted in the mobile terminal 101.

FIG. 2 is a rear view illustrating a mobile terminal having a near field communication antenna device according to the related art.

Referring to FIG. 2, a mobile terminal near field communication antenna device 200 formed with an antenna line forming a loop is mounted within a rear case 203 of a mobile terminal 201.

Because such mobile terminal near field communication antenna devices 100 and 200 of the related art are formed with an antenna line formed at the inside of the battery 102 or the inside of the rear case 203, a thickness of the battery 102 or the rear case 203 increases by about 0.4 T. Accordingly, the thickness of the mobile terminals 101 and 201 also increases. Furthermore, because a separate antenna line should be formed, a material cost of the mobile terminal increases.

Therefore, a need exists for a mobile terminal near field communication antenna device that can embody a near field communication antenna using a conductive pattern of an existing touch screen panel.

SUMMARY OF THE INVENTION

Aspects of the present invention are to address at least the above-mentioned problems and/or disadvantages and to provide at least the advantages described below. Accordingly, an aspect of the present invention is to provide a mobile terminal near field communication antenna device that can embody a near field communication antenna using a conductive pattern of an existing touch screen panel.

In accordance with an aspect of the present invention, a near field communication antenna device of a mobile terminal is provided. The device includes a conductive pattern formed in a touch screen panel, a first antenna line Alternating Current (AC)-coupled to one end of the conductive pattern, a second antenna line AC-coupled to the other end of the conductive pattern, and a near field communication module connected to the first antenna line and the second antenna line.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention proposed herein relate to a mobile terminal near field communication antenna device that can embody a near field communication antenna using a conductive pattern of an existing touch screen panel.

FIGS. 3 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
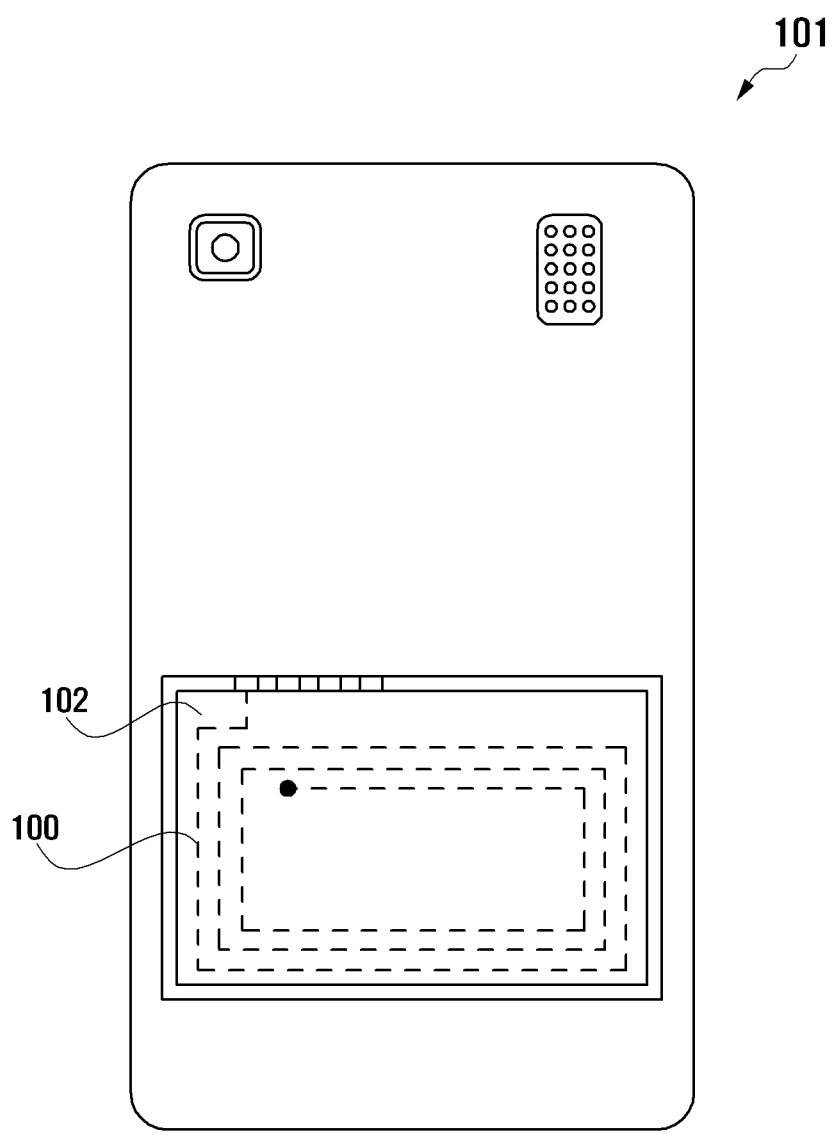
FIG. 1 is a rear view illustrating a mobile terminal having a near field communication antenna device according to the related art.
Figure 2:
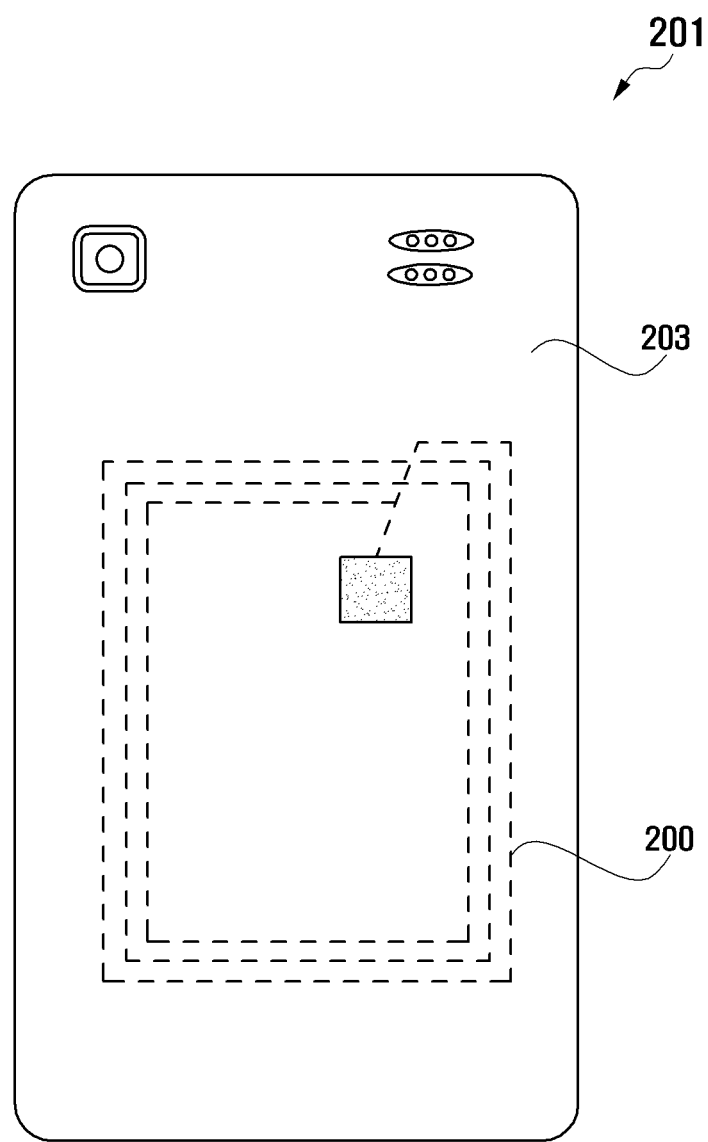
FIG. 2 is a rear view illustrating a mobile terminal having a near field communication antenna device according to the related art.
Figure 3:
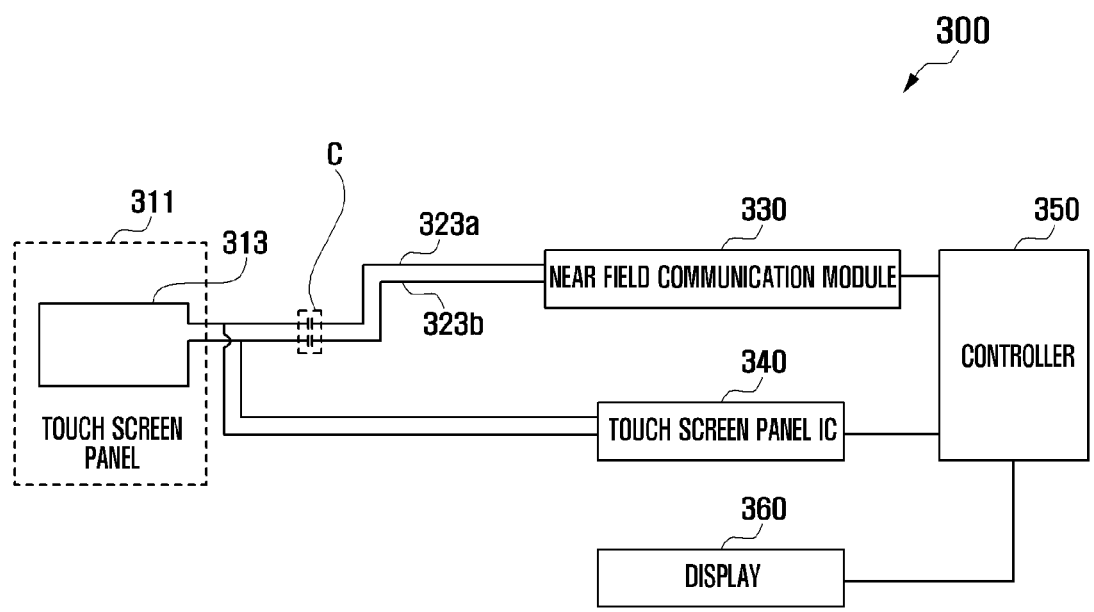
FIG. 3 is a block diagram illustrating a configuration of a mobile terminal near field communication antenna device according to an exemplary embodiment of the present invention.
Figure 4:
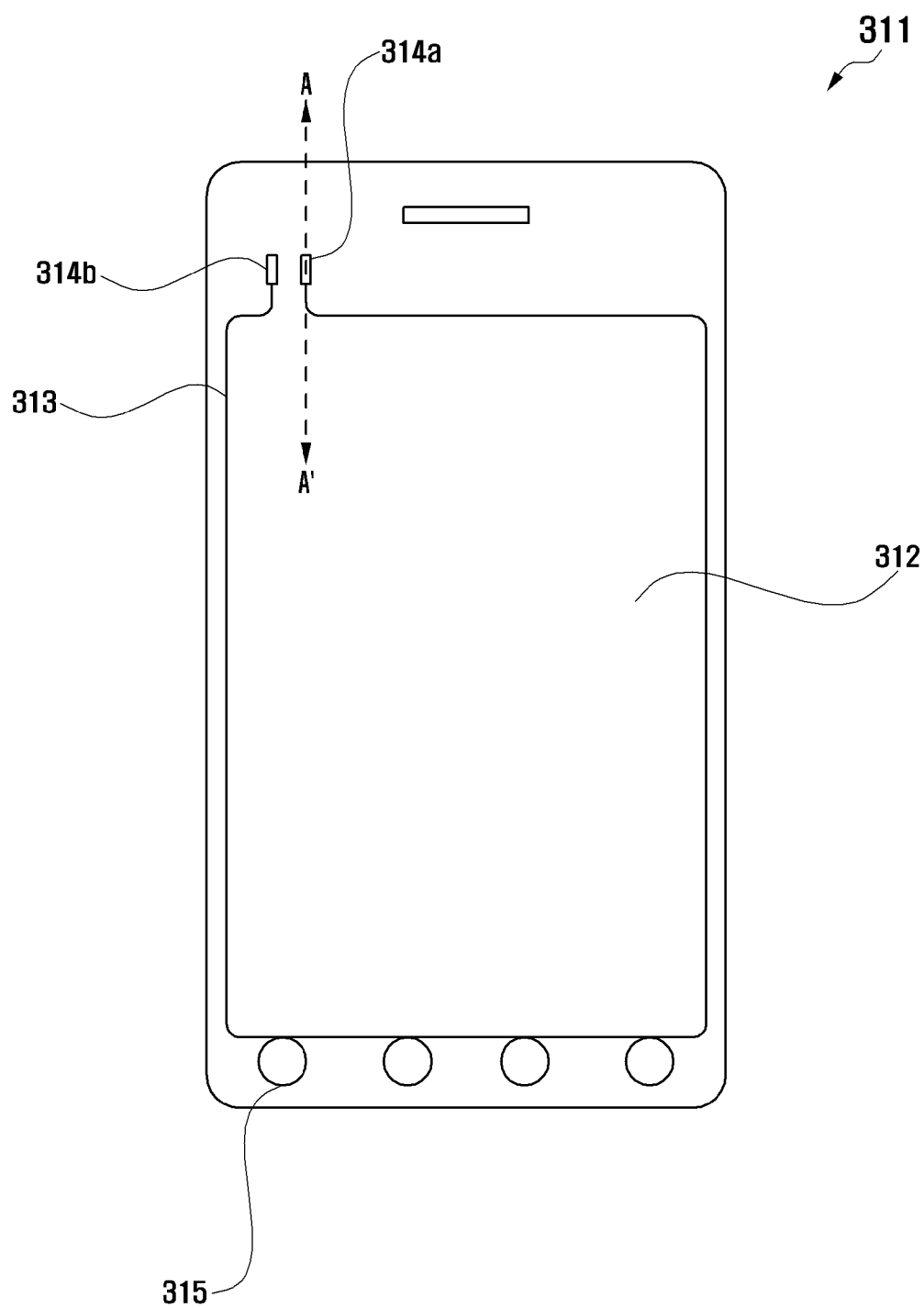
FIG. 4 is a rear view illustrating a window forming a touch screen panel in the mobile terminal of FIG. 3 according to an exemplary embodiment of the present invention.
Figure 5:
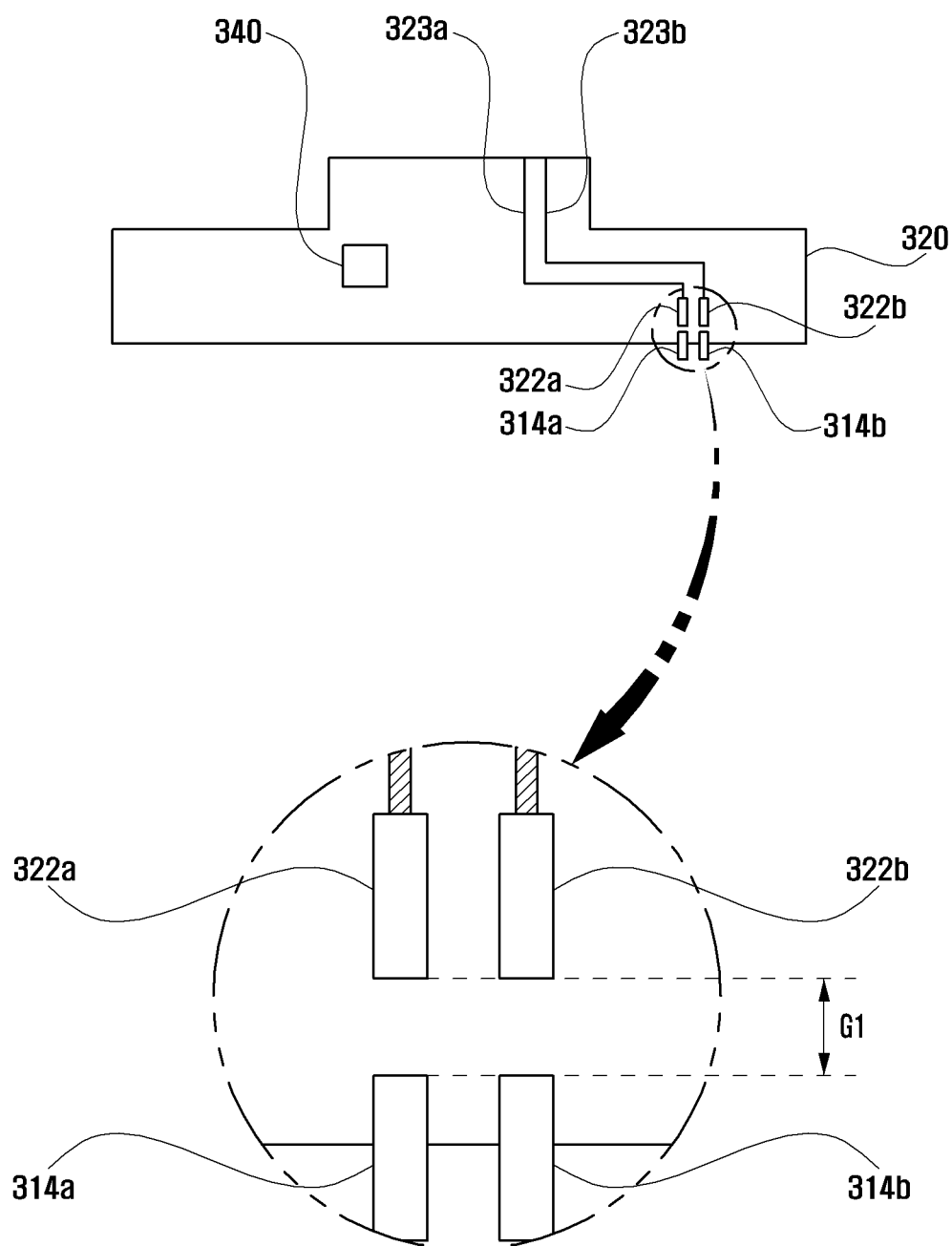
FIG. 5 illustrates a touch screen panel Flexible Printed Circuit Board (FPCB) of the near field communication antenna device of FIG. 3 according to an exemplary embodiment of the present invention.
Figure 6:
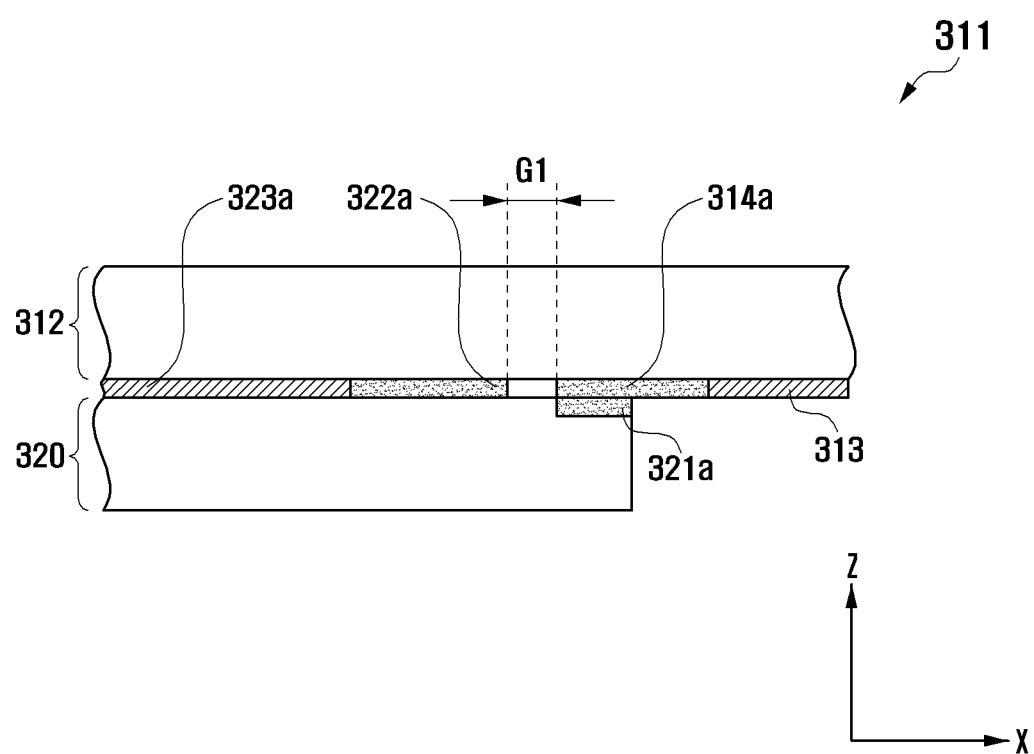
FIG. 6 is a cross-sectional view illustrating a configuration in which a first terminal pad of a conductive pattern and a terminal pad of a first antenna line form Alternating Current (AC) coupling taken along line A-A' of FIG. 4 according to an exemplary embodiment of the present invention.

FIG. 3 is a block diagram illustrating a configuration of a near field communication antenna device of a mobile terminal according to an exemplary embodiment of the present invention, FIG. 4 is a rear view illustrating a window forming a touch screen panel in the mobile terminal of FIG. 3 according to an exemplary embodiment of the present invention, FIG. 5 illustrates a touch screen panel Flexible Printed Circuit Board (FPCB) of the near field communication antenna device of FIG. 3 according to an exemplary embodiment of the present invention, and FIG. 6 is a cross-sectional view illustrating a configuration in which a first terminal pad of a conductive pattern and a terminal pad of a first antenna line form Alternating Current (AC) coupling taken along line A-A' of FIG. 4 according to an exemplary embodiment of the present invention. For reference, an X-axis direction, a Y-axis direction, and a Z-axis direction illustrated in FIGS. 4 and 6 are a length direction, width direction, and thickness direction, respectively, of a touch screen panel 311.

Referring to FIGS. 3 through 6, a mobile terminal near field communication antenna device 300 is described. The mobile terminal near field communication antenna device 300 includes a touch screen panel 311, a touch screen panel FPCB 320, a first antenna line 323a, a second antenna line 323b, a near field communication module 330, a touch screen panel Integrated Circuit (IC) 340, and a controller 350.

The touch screen panel 311 detects a user touch to a specific point of an image displayed in a display 360. The touch screen panel 311 includes a window 312, a conductive pattern 313, a touch key sensor 315, and a touch screen sensor (not shown). The window 312 performs a function of displaying an image displayed in the display 360 to the user while protecting the display 360 from the outside. The touch screen sensor may be formed in a rear surface of the window 312, or may be formed in a film (not shown) disposed at a rear side of the window 312. The touch key sensor 315 detects a user touch to a touch key (not shown) and is formed in a rear surface of the window 312. The conductive pattern 313 performs a function of outputting touch information that is input to the touch key sensor 315 to the touch screen panel FPCB 320. The conductive pattern 313 is formed in a loop shape in a rear surface of the window 312. At one end of the conductive pattern 313, a first terminal pad 314a for contacting with a first contact point 321a electrically connected to the touch screen panel IC 340 is formed, and at the other end of the conductive pattern 313, a second terminal pad 314b for contacting with a second contact point (not shown) electrically connected to the touch screen panel IC 340 is formed.

The touch screen panel FPCB 320 outputs touch information processed in the touch screen panel IC 340 to the controller 350 while mounting the touch screen panel IC 340. The first contact point 321a for outputting touch information received in the first terminal pad 314a of the conductive pattern 313 to the touch screen panel IC 340 and a second contact point for outputting touch information received in the second terminal pad 314b of the conductive pattern 313 to the touch screen panel IC 340 are formed in the touch screen panel FPCB 320.

The touch screen panel IC 340 processes touch information input from a touch screen sensor or the touch key sensor 315 and outputs the touch information to the controller 350. The touch screen panel IC 340 is mounted in the touch screen panel FPCB 320.

A first antenna line 323a is AC-coupled to the first terminal pad 314a of the conductive pattern 313 and is a conductive line connected to the near field communication module 330. At one end of the first antenna line 323a, a terminal pad 322a AC-coupled to the first terminal pad 314a of the conductive pattern 313 is formed. AC coupling intercepts a direct current signal by capacitance C formed between two terminal pads 314a and 322a and passes through only an alternating current signal.

A second antenna line 323b is AC-coupled to the second terminal pad 314b of the conductive pattern 313 and is a conductive line connected to the near field communication module 330. At one end of the second antenna line 323b, a terminal pad 322b AC-coupled to the second terminal pad 314b of the conductive pattern 313 is formed.

Referring to FIG. 6, an exemplary embodiment of a configuration in which the first terminal pad 314a of the conductive pattern 313 and the terminal pad 322a of the first antenna line 323a form AC coupling is described. The first terminal pad 314a of the conductive pattern 313 is separated by a predefined gap G1 in an X-axis direction from the terminal pad 322a of the first antenna line 323a. Capacitance C is represented by EXAM (i.e., g is a dielectric constant, A is an opposing area of terminal pads, and d is a distance between terminal pads). Therefore, since an opposing area of the first terminal pad 314a of the conductive pattern 313 and the terminal pad 322a of the first antenna line 323a is small, by reducing a gap G1 between the first terminal pad 314a of the conductive pattern 313 and the terminal pad 322a of the first antenna line 323a, desired capacitance C can be obtained.

Figure 7:
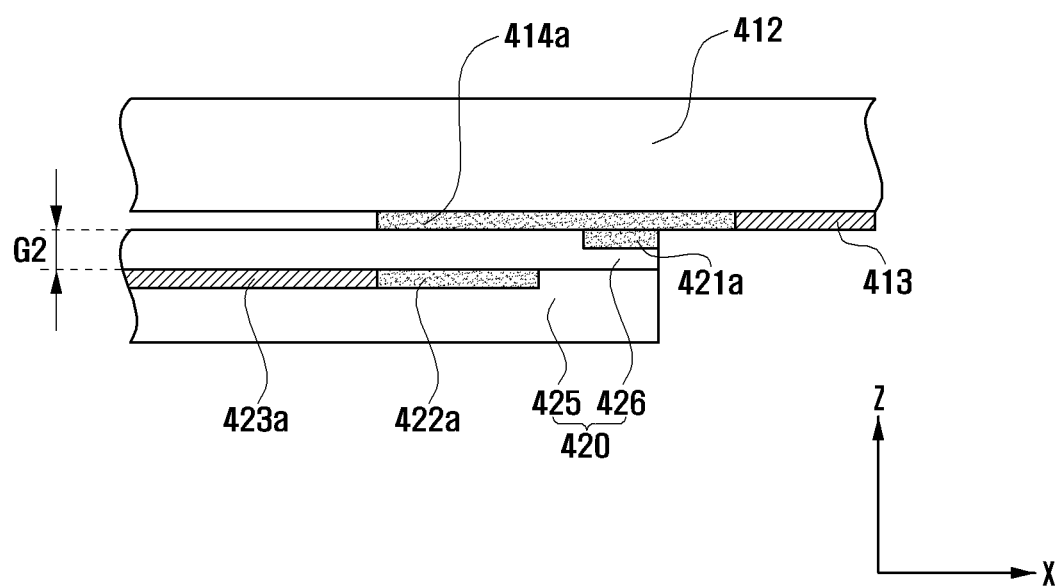
FIG. 7 is a cross-sectional view illustrating a configuration in which a first terminal pad of a conductive pattern and a terminal pad of a first antenna line form AC coupling according to an exemplary embodiment of the present invention.

FIG. 7 is a cross-sectional view illustrating a configuration in which a first terminal pad of a conductive pattern and a terminal pad of a first antenna line form AC coupling according to an exemplary embodiment of the present invention.

Referring to FIG. 7, a configuration in which a first terminal pad 414a of a conductive pattern 413 and a terminal pad 422a of a first antenna line 423a form AC coupling is described. The conductive pattern 413 is formed in a loop shape in a rear surface of a window 412. The first terminal pad 414a of the conductive pattern 413 and the terminal pad 422a of the first antenna line 423a are separated by a predefined gap G2 in a Z-axis direction. A first contact point 421a is formed for contacting with the first terminal pad 414a. A touch screen panel FPCB 420 is formed by attaching a lower layer FPCB 425 having the first antenna line 423a and the terminal pad 422a to a lower surface of an upper layer FPCB 426 with which the first terminal pad 414a of the conductive pattern 413 contacts.

Figure 8:
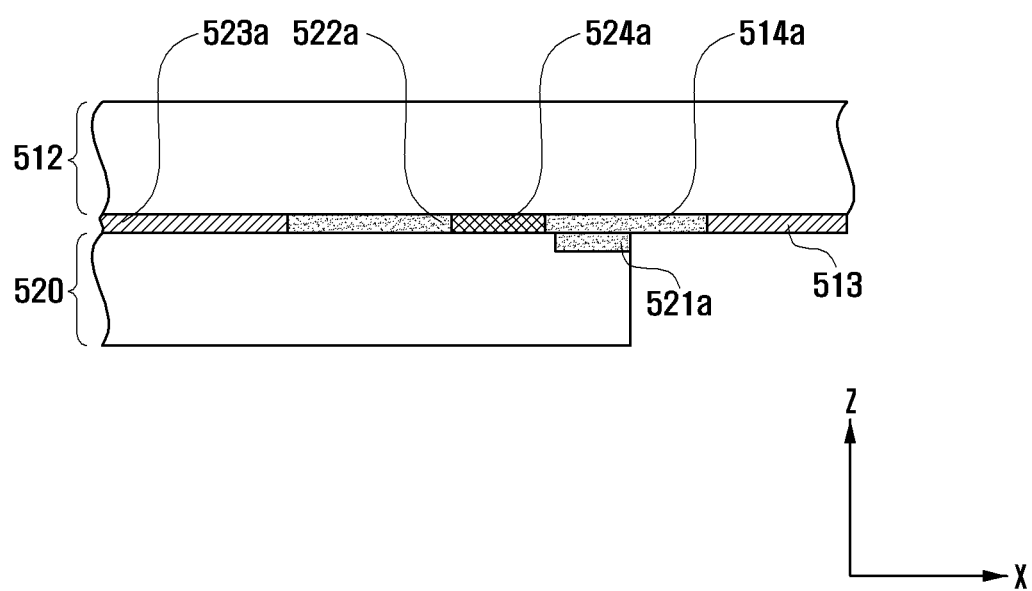
FIG. 8 is a cross-sectional view illustrating a configuration in which a first terminal pad of a conductive pattern and a terminal pad of a first antenna line form AC coupling according to an exemplary embodiment of the present invention.

FIG. 8 is a cross-sectional view illustrating a configuration in which a first terminal pad of a conductive pattern and a terminal pad of a first antenna line form AC coupling according to an exemplary embodiment of the present invention.

Referring to FIG. 8, a configuration in which a first terminal pad 514a of a conductive pattern 513 and a terminal pad 522a of a first antenna line 523a form AC coupling is described. The first terminal pad 514a of the conductive pattern 513 is connected to the terminal pad 522a of the first antenna line 523a through a lumped element capacitor 524a. Accordingly, accurate capacitance C can be obtained by the lumped element capacitor 524a. The conductive pattern 513 is formed in a loop shape in a rear surface of a window 512 and a first contact point 521a is formed in a touch screen panel FPCB 520 for contacting with the first terminal pad 514a.

FIGS. 6 through 8 illustrate AC coupling between the first terminal pads 314a, 414a, and 514a of the conductive patterns 313, 413, and 513 and the terminal pads 322a, 422a, and 522a of the first antenna lines 323a, 423a, and 523a. However, AC coupling between the second terminal pad of a conductive pattern and a terminal pad of the second antenna line is formed in a similar method.

The near field communication module 330 processes a signal transmitted and received between the first antenna line 323a, the second antenna line 323b and the controller 350, and the controller 350 controls the display 360 or the near field communication module 330 according to a signal transmitted from the touch screen panel IC 340 or the near field communication module 330.

According to an exemplary implementation, the first and second terminal pads 314a and 314b formed at both ends of the conductive pattern 313 are AC-coupled to the terminal pads 322a and 322b of the first and second antenna lines 323a and 323b connected to the near field communication module 330. Accordingly, a near field communication can be performed using the conductive pattern 313 of the existing touch screen panel 311.

According to an exemplary embodiment of the present invention, a mobile terminal near field communication antenna device includes a first and second antenna lines AC-coupled to each of both ends of a conductive pattern formed in a touch screen panel and connected to the near field communication module and thus a near field communication antenna can be embodied using a conductive pattern of an existing touch screen panel. Accordingly, an increase in thickness and material cost of a mobile terminal can be prevented.

While the invention has been shown and described with reference to certain exemplary embodiments thereto, it will be understood by those skilled in the art that various changes in form and details may be made therein without departing from the spirit and scope of the invention as defined by the appended claims and their equivalents.

What is claimed is:

1. An apparatus comprising:
a conductive pattern disposed within a touch screen panel;
an antenna line Alternating Current (AC)-coupled with the conductive pattern; and
a communication device connected to the antenna line,
wherein the communication device is configured to perform near field communication using the conductive pattern disposed within the touch screen panel, and
wherein the AC coupling is configured to intercept a direct current signal and pass through only an alternating current signal by capacitance formed between a terminal pad of the conductive pattern and a terminal pad of the antenna line.

2. The apparatus of claim 1, further comprising:
at least one processor configured to transmit a signal via the antenna line, the at least one processor operatively coupled with the apparatus.

3. The apparatus of claim 2, wherein the at least one processor is further configured to:
transmit another signal via the conductive pattern to detect a touch.

4. The apparatus of claim 1, further comprising:
another antenna line Alternating Current (AC)-coupled with the conductive pattern.

5. The apparatus of claim 4, wherein the other antenna line is connected to the communication device.

6. The apparatus of claim 1, further comprising:
a terminal formed at an end of the conductive pattern.

7. The apparatus of claim 6, wherein the terminal and at least a portion of the antenna line form a capacitance.

8. The apparatus of claim 6, further comprising:
another terminal formed at another end of the conductive pattern.

9. The apparatus of claim 8, wherein the other terminal and at least a portion of another antenna line form a capacitance, the other antenna line Alternating Current (AC)-coupled with the conductive pattern.

10. The apparatus of claim 1, wherein the conductive pattern is formed in a loop shape.

11. A portable terminal comprising:
a window for transmitting an image displayed via a display operatively coupled with the portable terminal;
a touch screen panel disposed on or over the window, the touch screen panel including a conductive pattern;

an antenna line Alternating Current (AC)-coupled with the conductive pattern; and a communication device connected to the antenna line, wherein the communication device is configured to perform near field communication using the conductive pattern included in the touch screen panel, and wherein the AC coupling is configured to intercept a direct current signal and pass through only an alternating current signal by capacitance formed between a terminal pad of the conductive pattern and a terminal pad of the antenna line.

12. The portable terminal of claim 11, further comprising:
at least one processor configured to transmit a signal via the communication device, the at least one processor operatively coupled with the portable terminal.

13. The portable terminal of claim 12, wherein the at least one processor is further configured to:
transmit another signal via the conductive pattern.

14. The portable terminal of claim 12, further comprising:
a printed circuit board disposed on or over the touch screen panel, the at least one processor disposed on the printed circuit board.

15. The portable terminal of claim 11, further comprising:
another antenna line Alternating Current (AC)-coupled with the conductive pattern.

16. The portable terminal of claim 15, wherein the other antenna line is connected to the communication device.

17. The portable terminal of claim 11, wherein the conductive pattern is disposed on or over the window.

18. The portable terminal of claim 11, further comprising:
a film disposed in the touch screen panel, the conductive pattern disposed on or over the film.

19. The portable terminal of claim 11, wherein the touch screen panel includes at least one of a touch screen sensor and a touch key.

20. An apparatus comprising: a conductive pattern disposed within a touch screen panel operatively coupled with the apparatus; an antenna line Alternating Current (AC)-coupled with the conductive pattern; and at least one processor connected to the antenna line, the at least one processor configured to transmit a signal via the antenna line, wherein the at least one processor is configured to perform near field communication using the conductive pattern disposed within the touch screen panel, and wherein the AC coupling is configured to intercept a direct current signal and pass through only an alternating current signal by capacitance formed between a terminal pad of the conductive pattern and a terminal pad of the antenna line.

* * * * *